US008863511B2

(12) United States Patent
Swamidass (10) Patent No.: US 8,863,511 B2
(45) Date of Patent: Oct. 21, 2014

(54) WAVE AND WATER ENERGY CONVERTER MOUNTED ON BRIDGE SUPPORTS

(71) Applicant: Paul M Swamidass, Auburn, AL (US)

(72) Inventor: Paul M Swamidass, Auburn, AL (US)

(*) Notice: Subject to any disclaimer, the term of this patent is extended or adjusted under 35 U.S.C. 154(b) by 0 days.

(21) Appl. No.: 13/984,498

(22) PCT Filed: Mar. 14, 2013

(86) PCT No.: PCT/US2013/031334

§ 371 (c)(1),
(2), (4) Date: Aug. 8, 2013

(87) PCT Pub. No.: WO2013/148243

PCT Pub. Date: Oct. 3, 2013

(65) Prior Publication Data

US 2014/0084589 A1    Mar. 27, 2014

Related U.S. Application Data

(63) Continuation-in-part of application No. 13/429,375, filed on Mar. 24, 2012, now Pat. No. 8,459,020.

(51) Int. Cl.
| | | |
|---|---|---|
| F03B 17/02 | (2006.01) | |
| F03B 13/10 | (2006.01) | |
| F03B 13/12 | (2006.01) | |
| F03B 13/00 | (2006.01) | |
| F04B 17/00 | (2006.01) | |
| F04B 17/02 | (2006.01) | |
| F03B 13/24 | (2006.01) | |
| F03B 13/18 | (2006.01) | |
| F03B 13/22 | (2006.01) | |
| F03B 17/06 | (2006.01) | |

(52) U.S. Cl.
CPC ............. *F03B 13/22* (2013.01); *F03B 13/24* (2013.01); *F03B 13/1815* (2013.01); *F03B 17/066* (2013.01); *F05B 2240/911* (2013.01); *Y02E 10/28* (2013.01); *F03B 17/065* (2013.01); *Y02E 10/38* (2013.01)
USPC .............. 60/495; 290/42; 290/43; 290/53; 290/54; 417/330; 417/334

(58) Field of Classification Search
CPC ............. F03B 13/12–13/268; Y02E 10/20; Y02E 10/28; Y02E 10/32; Y02E 10/38; Y02E 60/17
USPC ............. 60/495–507; 290/42, 43, 53, 54; 415/2.1, 3.1, 4.1, 4.2, 4.4; 417/330–334
See application file for complete search history.

(56) References Cited

U.S. PATENT DOCUMENTS

| | | | | |
|---|---|---|---|---|
| 635,390 | A * | 10/1899 | Rehart | 417/332 |
| 681,913 | A * | 9/1901 | Gillespie | 417/332 |
| 1,004,332 | A * | 9/1911 | Allen | 60/507 |
| 1,074,292 | A * | 9/1913 | Reynolds | 416/86 |
| 1,263,865 | A * | 4/1918 | Dale | 415/60 |
| 3,487,228 | A * | 12/1969 | Kriegel | 290/52 |
| 4,392,060 | A * | 7/1983 | Ivy | 290/53 |
| 4,462,762 | A * | 7/1984 | Palani | 417/332 |
| 5,440,175 | A * | 8/1995 | Mayo et al. | 290/54 |
| 6,534,881 | B1 * | 3/2003 | Slavchev | 290/54 |
| 6,616,403 | B1 * | 9/2003 | Smith et al. | 415/3.1 |

* cited by examiner

*Primary Examiner* — Christopher Jetton (57) ABSTRACT

This is a low-cost, ingenious, high-efficiency energy producing system from hydrokinetic energy in water waves, currents and tides. Cost advantages are due to the use of existing bridge structures to mount the water energy converter to withstand fierce wind and water forces.

3 Claims, 16 Drawing Sheets

WATER

WAVE AND WATER ENERGY CONVERTER MOUNTED ON BRIDGE SUPPORTS

CROSS-REFERENCE TO RELATED APPLICATIONS AND CLAIMS TO PRIORITY

This is a continuation-in-part of, and claims priority commonly assigned to U.S. patent application Ser. No. 13/429,375 filed on Mar. 24, 2012, now U.S. Pat. No. 8,459,020, issued Jun. 11, 2013, and application PCT/US2013/031334 filed on Mar. 14, 2013 filed through the USPTO, the receiving office, the entire disclosure of which is incorporated herein by reference.

FIELD OF THE INVENTION

The invention substantially cuts the cost of HKEC systems because these systems may be retrofitted to existing bridge columns as well as to new bridge columns that support highway decks; the cost of the bridge structure may be fully absorbed by the cost of constructing the bridge. Consequently, the cost of this invention for generating electric energy from the HKEC system becomes substantially lower than what it would be without using the bridge structure; this invention will turn bridge columns into dual-use structures.

Therefore, this invention is a highly efficient HKEC system that extracts energy efficiently from waves, moving water and tidal flows.

BACKGROUND OF THE INVENTION

Prior Art

Water in ocean, sea and rivers offer plenty of energy but the technology to harvest HKE energy from water is still in the experimental stages. Two of the problems facing HKEC systems are the cost and low efficiency of such systems.

U.S. patent application Ser. No. 13/429,375 filed on Mar. 24, 2012, and now issued U.S. Pat. No. 8,459,020, and application PCT/US2013/031334 teach the following about existing technologies for HKEC systems: they require expensive investment in civil and mechanical systems to retain these systems in boisterous water during severe weather. Therefore HKEC systems require prohibitively expensive civil and mechanical structures to retain them during storms.

Highways over water are built on extremely strong columns that are capable of withstanding fiercest wind and water forces. These columns serve as dual-use inexpensive mounts for innovative HKEC systems of this invention. Further, this invention overcomes the well-known inefficiencies and immaturity of the submerged wave and water-energy conversion technologies in existence today.

GENERAL DESCRIPTION OF THE INVENTION

Bridge columns offer multiple opportunities to harvest wave and related energy from water under the bridge. Bridge-column-based HKEC systems include the following embodiments but are not limited to them. The inventions listed below are to be of the appropriate scale to prevent overloading of the bridge columns beyond their designed strength. The embodiments below can be mounted on bridge-supporting columns already in use (retrofitted) or designed in the future as part of new bridge structures over water.

There are no known devices attached to bridge columns for harvesting energy in the water under bridges. The invention includes the following multiple embodiments but not limited to them.

Embodiment 1

Floating Vertical-Axis Water Turbine-Generator (VAWT-Generator) that Slides on Bridge Columns This invention is a floating vertical-axis water-turbine-generator (VAWT-generator) that slides up and down the bridge column with the waves while the turbine is rotated by water currents, waves or tides by turning turbine blades dipping into the water to produce electricity. The generator may feed power to the power grid. The generator could be housed concentrically inside the turbine rotor or outside the rotor.

Brief Description of the Drawings for Embodiment 1

To explain the invention, a specific embodiment thereof is described with reference to FIGS. 1, 2, 2a, 2b, 3, 3a, 4 and 4a.

Detailed Description of Embodiment 1

Figure 1:
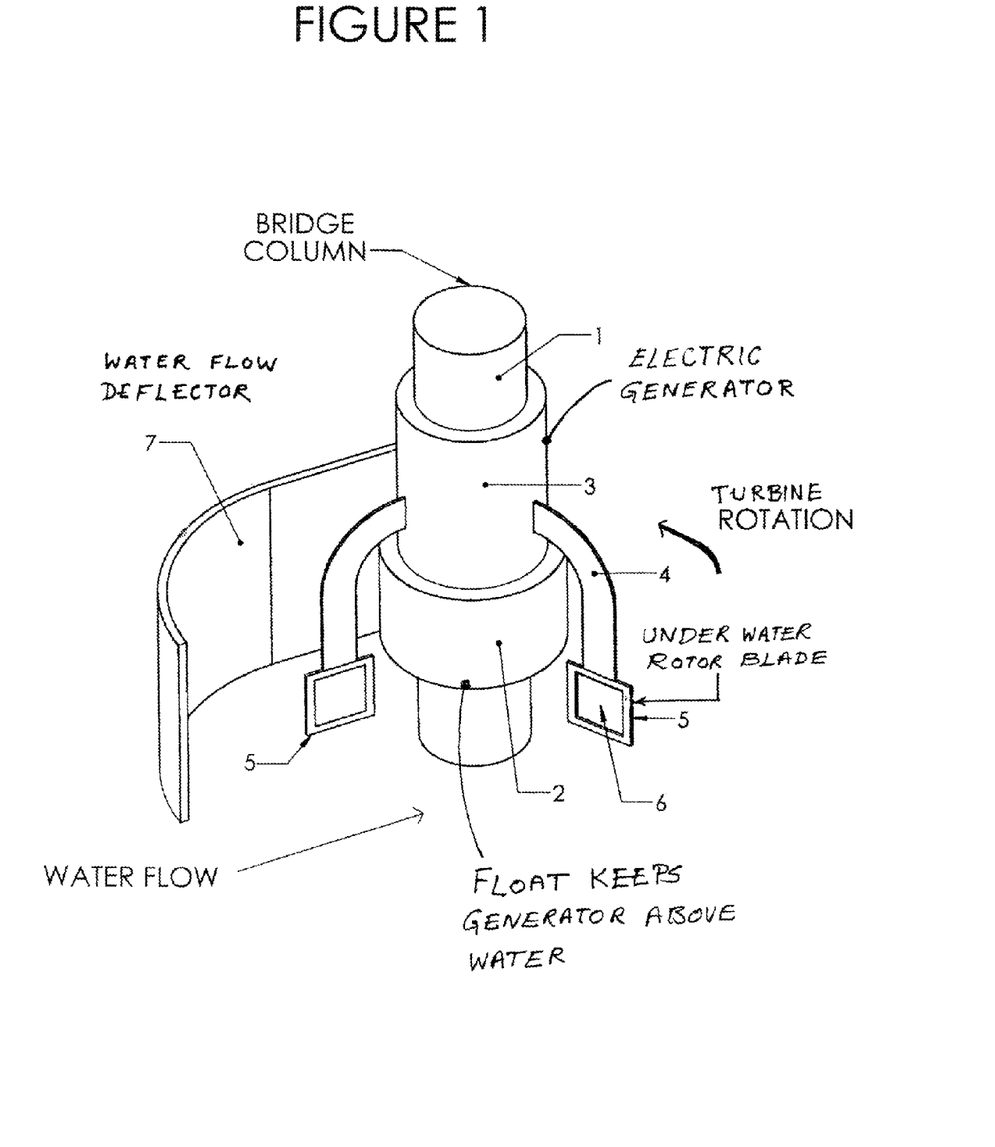
FIG. 1 is a perspective view of the invention where a vertically sliding, floating rotary turbine with blades dipping in water is mounted on one of the vertical columns supporting a bridge—the electric generator is internal to the turbine. The float does not rotate.

Referring to FIG. 1 of the drawings, vertically sliding float 2 takes the bridge column 1 through its center. A VAWT-generator is kept above the water by the float. The water turbine turns the outer rotor of the electricity generator, while its non-rotating stator slides vertically on the bridge column. The float does not rotate with the turbine. Two of the multiple blades 5 of the turbine are shown in FIG. 1, and they are designed with flaps 6 that are closed going downstream but are open going upstream to reduce water resistance on the upstream side. The flaps are designed to maximize the opening on the upstream side to allow water to flow through the blade with little resistance—this is accomplished by maximizing the ratio of flap area with respect to the total blade area.

The blades 5 are submerged in water but are attached to the turbine rotor 3 by arms 4. To reduce resistance to the rotation of the turbine blades, a flow deflector 7 diverts the incoming water away from the blades going upstream, but the water flow is unrestricted on the downstream side of the rotor in order to absorb energy from the water flow or waves or tides. Current, waves and tides apply rotary force on the downstream side to rotate turbine blades 5.

Figure 2:
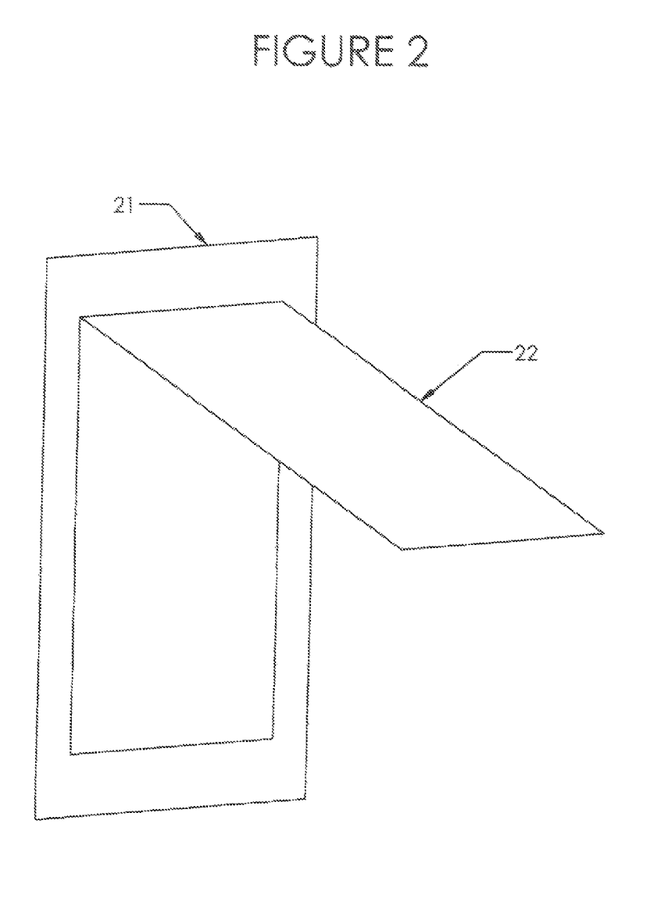
FIG. 2 is a perspective of the turbine blades with flap.

The detailed drawing of the blade in FIG. 2 shows blade 21 with flap 22. The drawing shows a substantially open flap in the upstream side offering least resistance to the rotation of the blade. The blade apparatus may use a powered assist to open and close the flap.

Figure 2A:
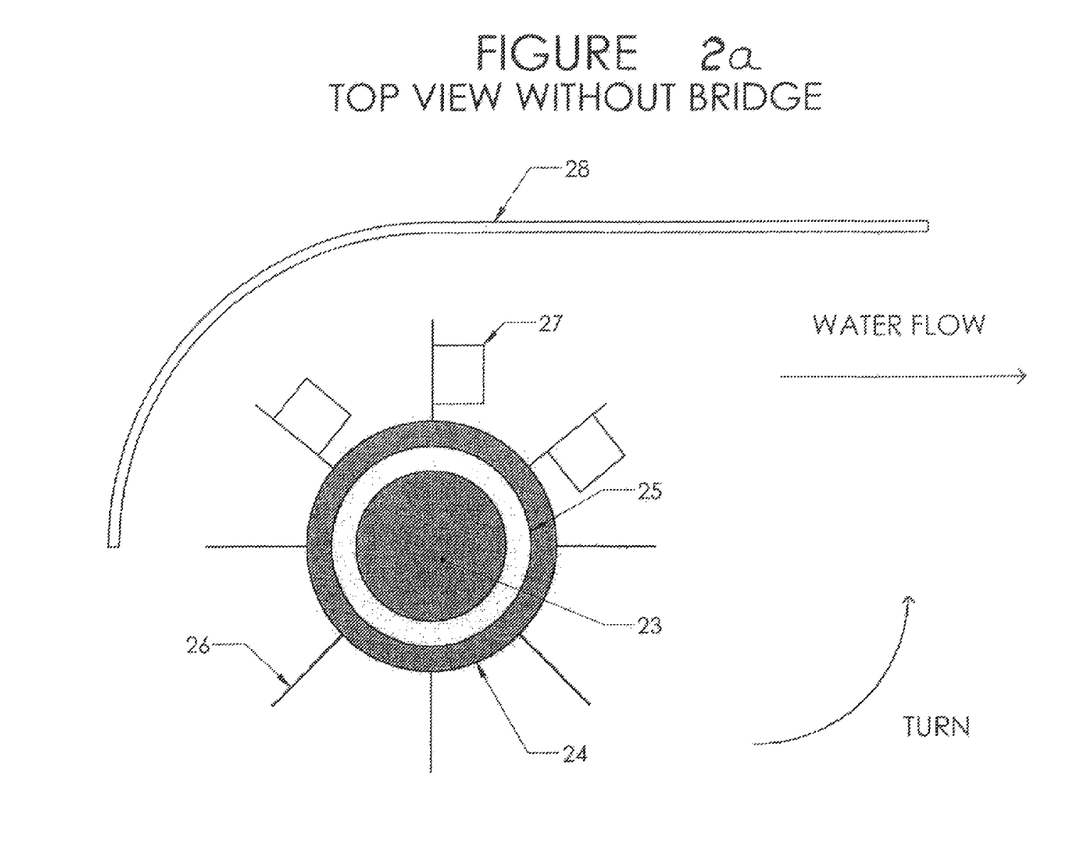
FIG. 2a is a top view of the apparatus with turbine blades with flaps.

In the top cross-sectional view of the apparatus in FIG. 2a, inner circle 23 is the bridge column, 24 is the float supporting the generator 25, and 26 are the blades attached to generator 25; the arms connecting the blades to generator 25 are not included in this figure for clarity of the drawing. In the upstream side, 27 are the flaps shown in the open position; in the open position, the blades have minimal resistance to the counter clockwise turning turbine and blades. In the upstream side, the blade flaps remain closed. Item 28 is the flow diverter on the upstream side.

Figure 2B:
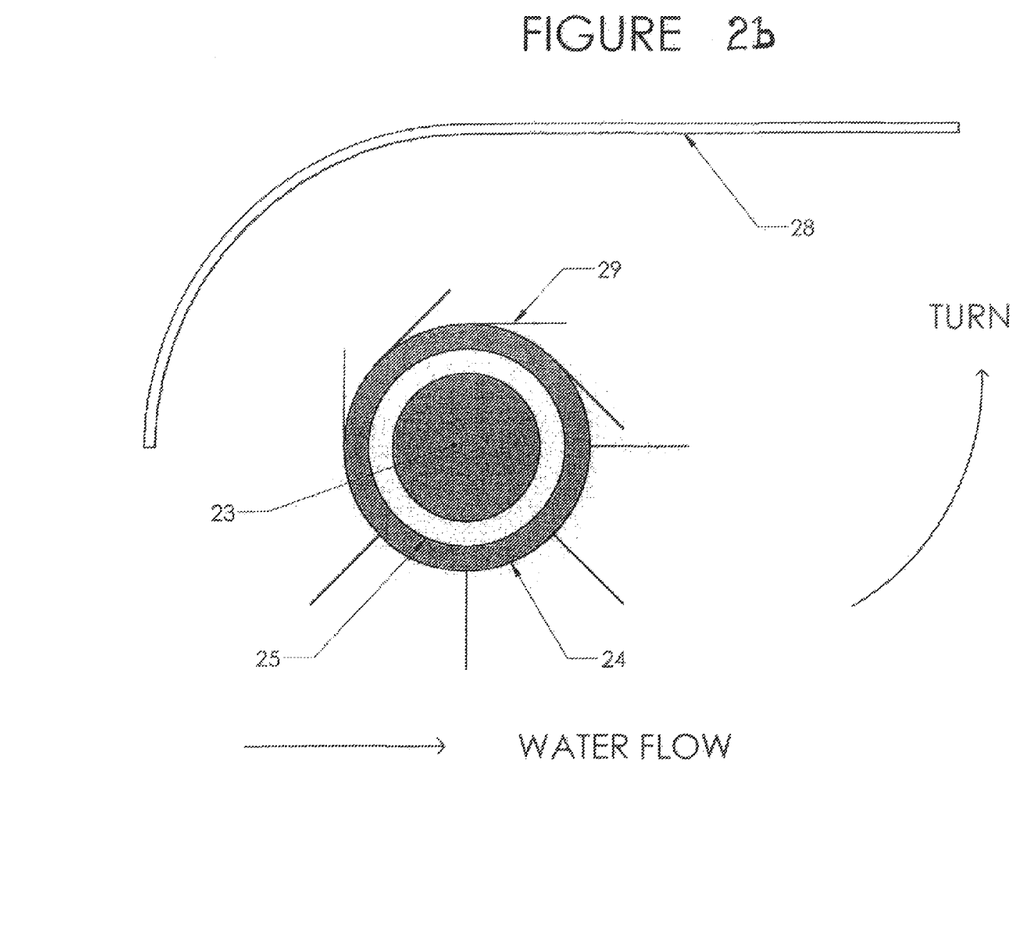
FIG. 2b is a top view of the apparatus with solid turbine blades that fold in the upstream direction but stand up radially in the downstream direction during rotation.

FIG. 2b shows another embodiment of the blades for minimizing the resistance to blade movement on the upstream side. In this embodiment, blade 29 is hinged so that it can bend backwards on the upstream side.

Figure 3:
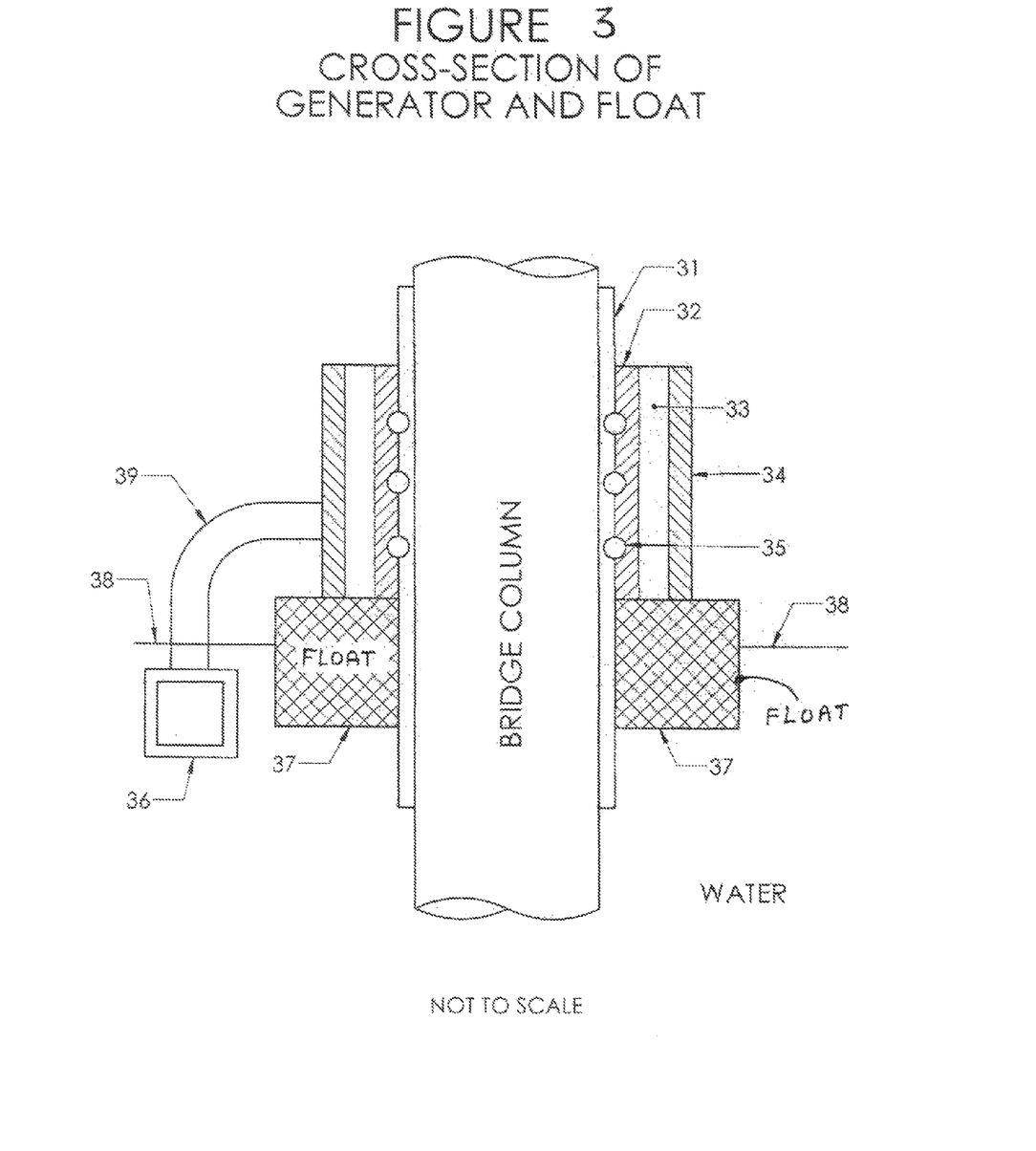
FIG. 3 is a vertical cross-section of the apparatus through the column, turbine, and float.

The detailed vertical cross-section in FIG. 3 shows a lubricated slider 31 fixed to the bridge column that allows VAWT-generator assembly slide up and down the bridge column on bearings 35. Vertically sliding but non-rotating stator of the generator is 32, while 34 being the rotor of the electric generator rotated by a plurality of blades 36 submerged under the water line 38. Each blade 36 is attached to the rotor by a rigid arm 39. The turbine and generator are kept afloat above the water line 38 by the non-rotating float 37 rigidly fixed to the stator 32. The float keeps the stator and rotor above the water line. The gap between the stator 32 and rotor 34 is represented by 33.

Figure 3A:
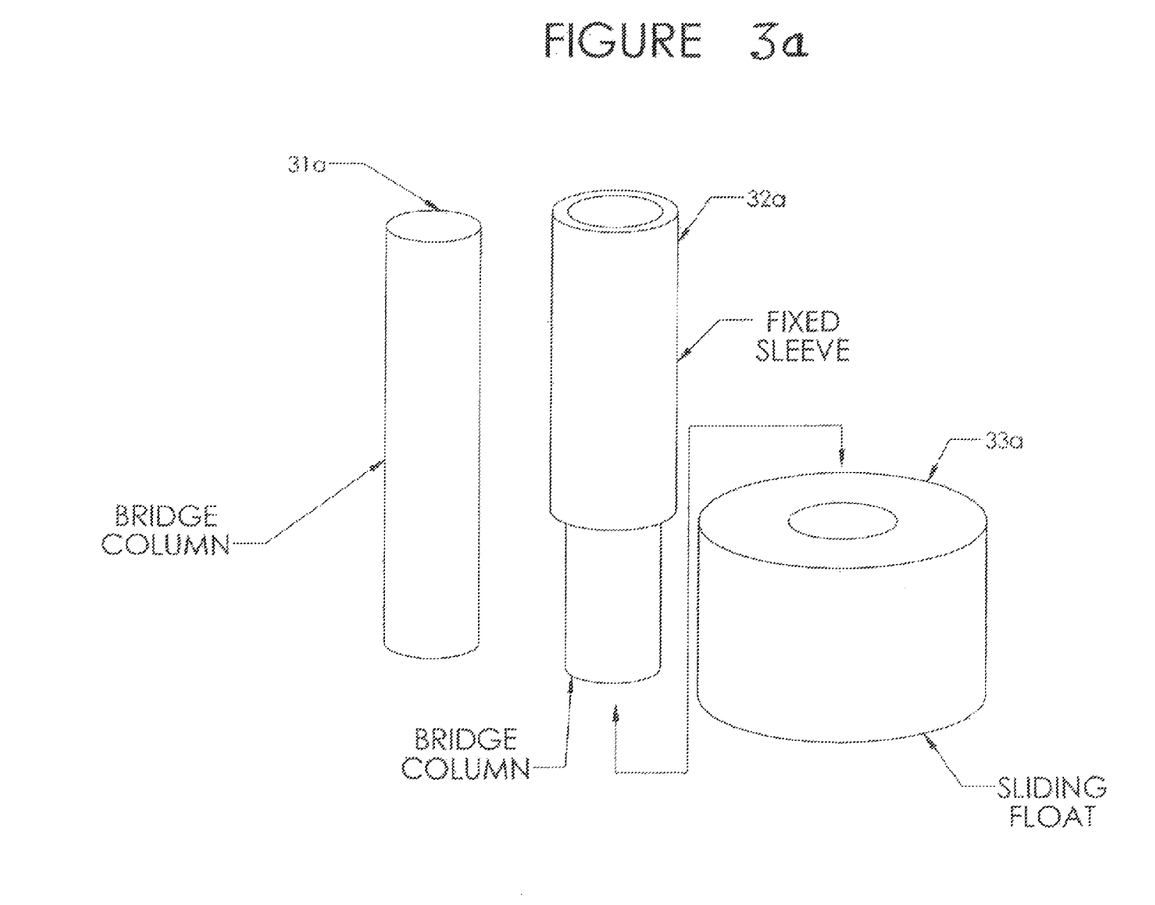
FIG. 3a shows a fixed cylindrical sleeve mounted on the cylindrical column, and a float that slides on the fixed sleeve.

FIG. 3a shows bridge column 31a fitted with a sleeve 32a. The sleeve is anchored to the column to prevent the sleeve from rotation. The outer surface of the sleeve allows the float 33a to slide up and down on the sleeve with minimal friction.

Figure 4:
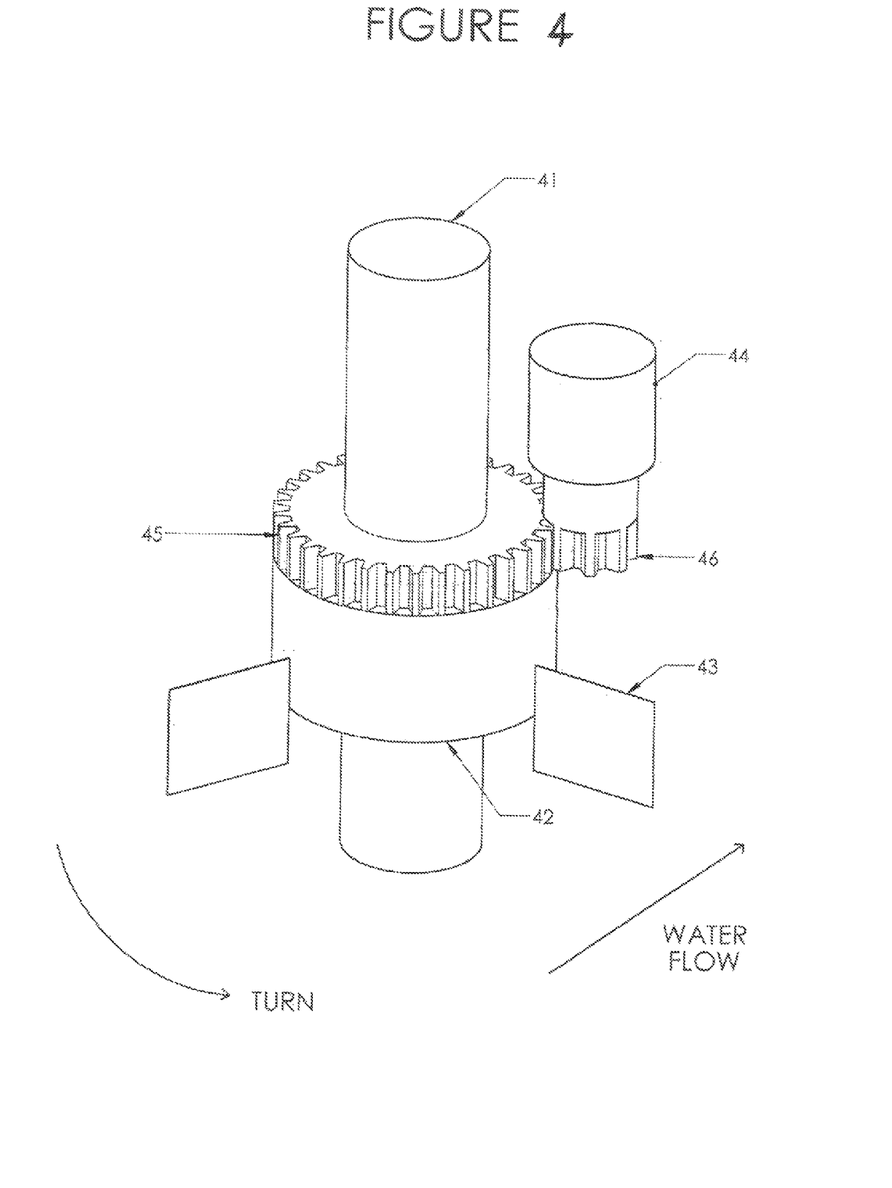
FIG. 4 is a perspective view of the turbine where the generator is mounted external to the turbine.

FIG. 4 shows that the generator 44 may be mounted outside the circumference of the float-water-turbine 42 sliding on bridge column 41. Turbine has external gears 45 that drive the pinion 46 on the electric generator shaft. Water turbine 42 is turned by a plurality of blades 43 (only two blades shown).

Figure 4A:
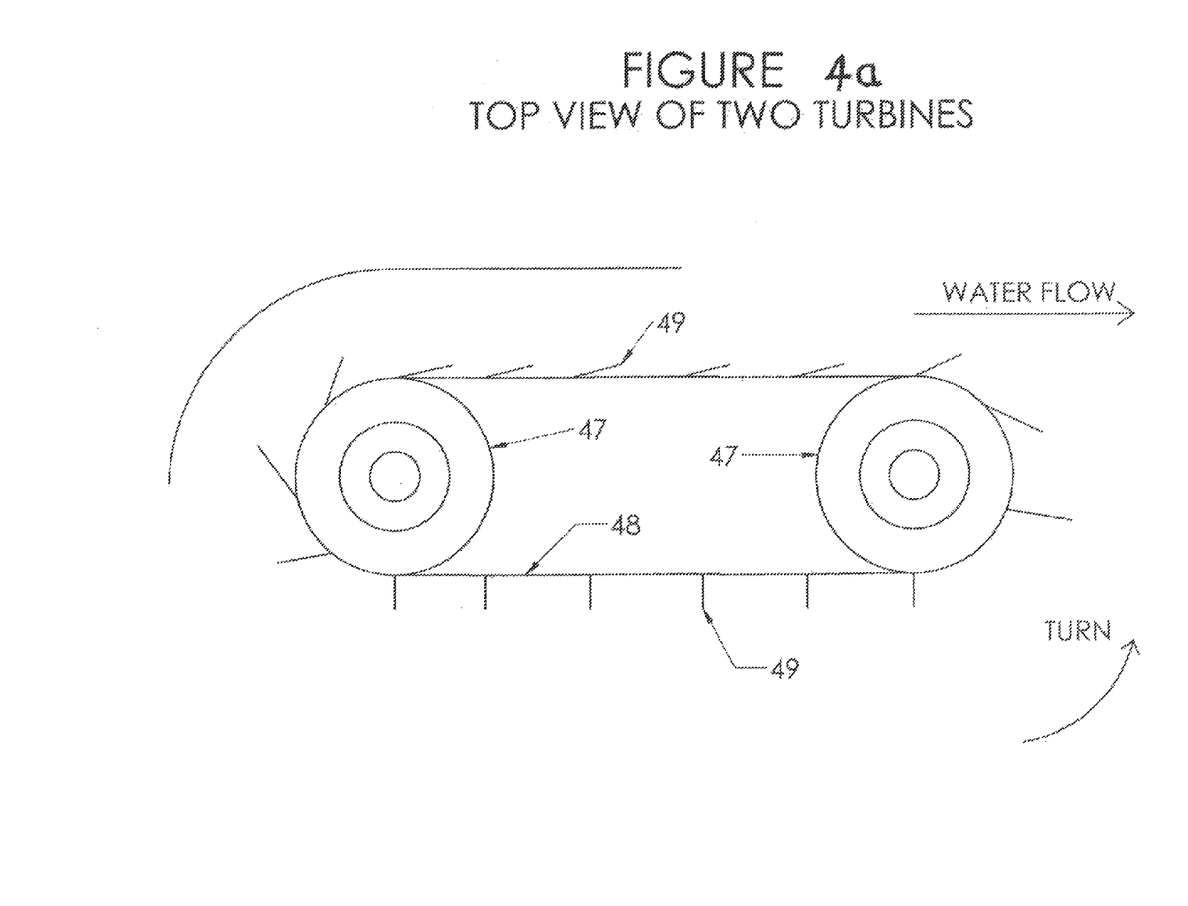
FIG. 4a shows the top view with two turbines driven by a single belt with a plurality of water turbine blades attached to it.

FIG. 4a shows the top cross-sectional view of two circular VAWT-generators 47 wrapped around two bridge columns as a variation of one turbine apparatus shown in FIG. 2a. Belt 48 with gear teeth, on the side facing the turbine, mesh with gear teeth on the outside of the turbine rotor and turn the turbine when the belt is moved anti-clockwise by water energy. In the embodiment shown, the belt has a plurality of equally spaced turbine blades 49 attached to it. The blades are hinged on Belt 48 so that on the upstream side, the blades fold down to minimize water resistance to the blades moving upstream.

Embodiment 2

Wave-Operated Pump Lifts Water to an Overhead Tank

A large float, which bobs up and down with the waves under a bridge, is attached to one or more rigid arms that are hinged at a high point in the bridge columns. The float or arms are connected to a reciprocating or rotary pump(s) to pump water up to fill water in a large overhead tank located just under the bridge deck. The elevated water in the tank is released through ducts to drive a water turbine(s) below to produce electric power. After driving the turbine, the spent water falls back into the body of water under the bridge.

Embodiment 2 could be used to pressurize air, gas or any fluid to drive turbines that turn electric generators.

Brief Description of Drawings for Embodiment 2

Detailed Description of Embodiment 2

Figure 5:
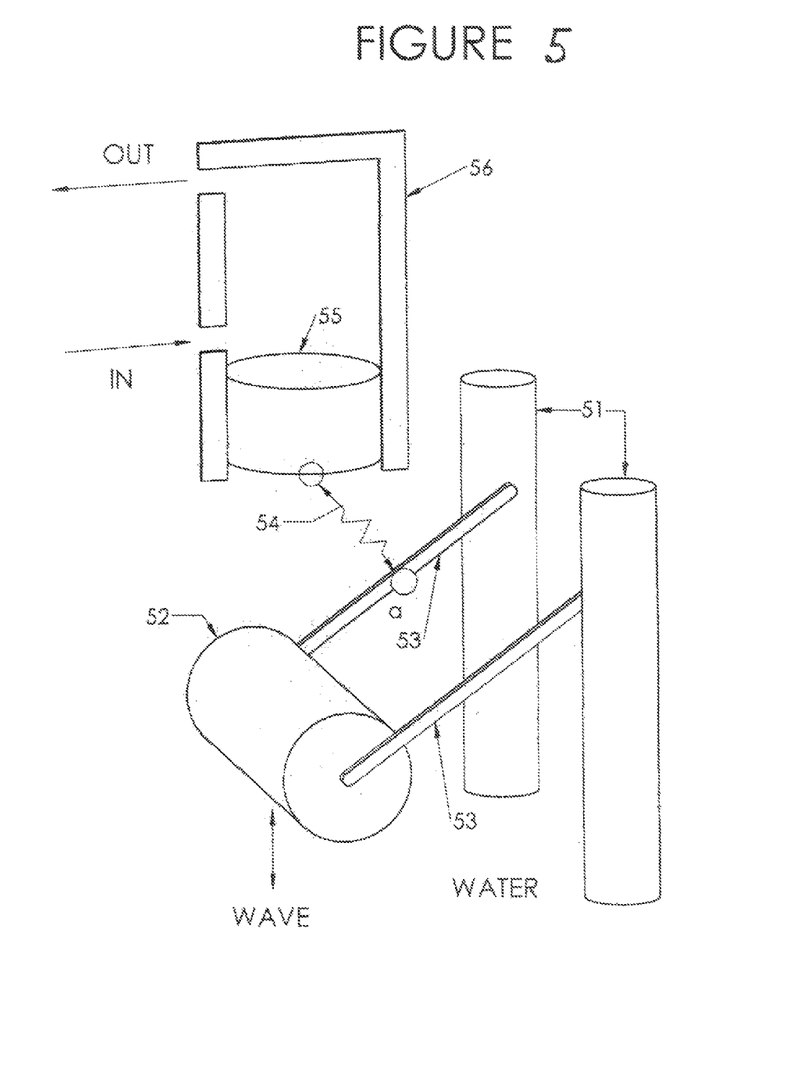
FIG. 5: It is a perspective view—bobbing tubular float provides reciprocating motion to a piston in a pump cylinder that lifts water to a tank that hangs just under the highway deck on the top of the bridge columns. Float is connected to long arms hinged to two columns.

FIG. 5 shows two long arms 53 that are hinged at two bridge columns 51. A large cylindrical float 52, which floats on the water below the bridge, is attached to the ends of the hinged arms 53 allowing the cylindrical float to bob up and down with the waves. The arm 53 is hinged to a connecting rod 54 which is attached to a reciprocating piston 55 inside a cylinder 56. The location "a" of the connection rod 54 on the arm 53 may be varied to vary the stroke and power of the piston stroke. FIG. 5 shows the location of "a" on the arm 53 between the column and the float but "a" could be placed on an extension of arm 53 beyond the column 51 for appropriate leverage. The water enters at "IN"; it is pressurized in the pump and goes "OUT" to an overhead tank in FIG. 6.

Figure 6:
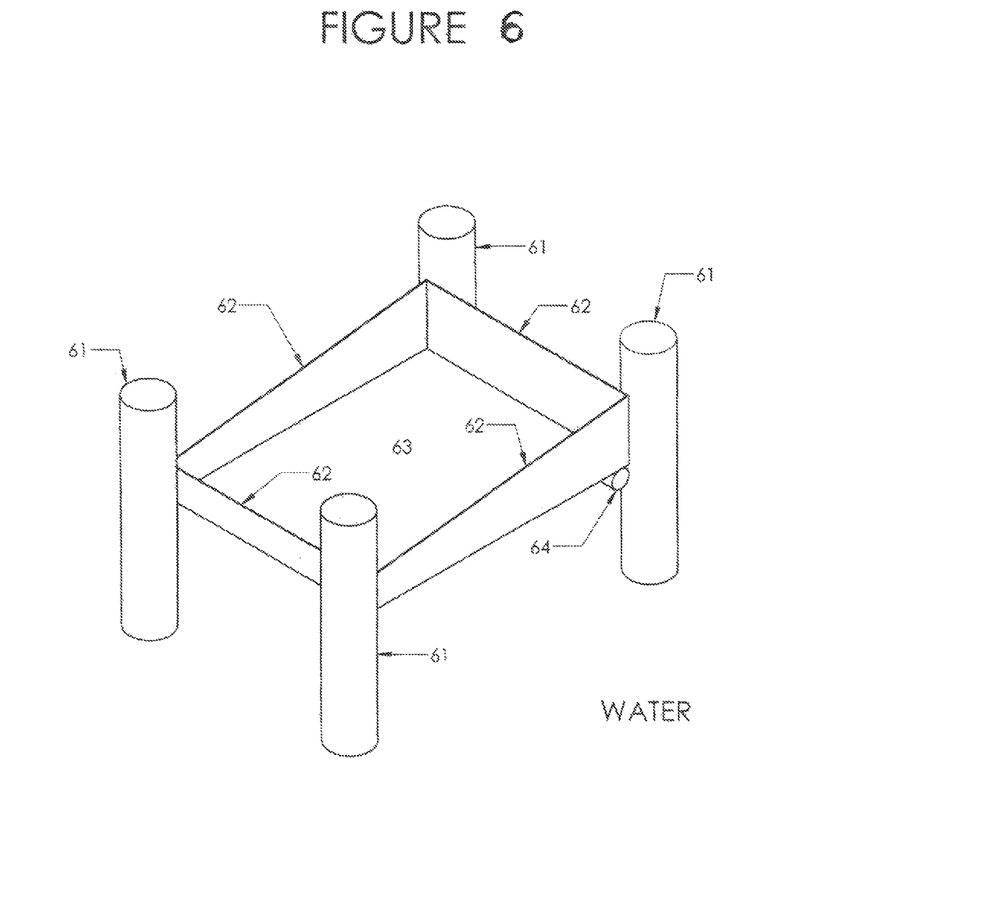
FIG. 6: It is a perspective of a water tank supported by bridge columns to hold water pumped up by the float-pump combination.

FIG. 6 shows a large water tank to hold the water that is pumped up by the bobbing float in FIG. 5. Columns 61 hold the tank up; the tank sides are 62, and the bottom of the tank is 63. The water from the tank is allowed to fall from spout 64 to a water turbine-generator below.

Figure 7:
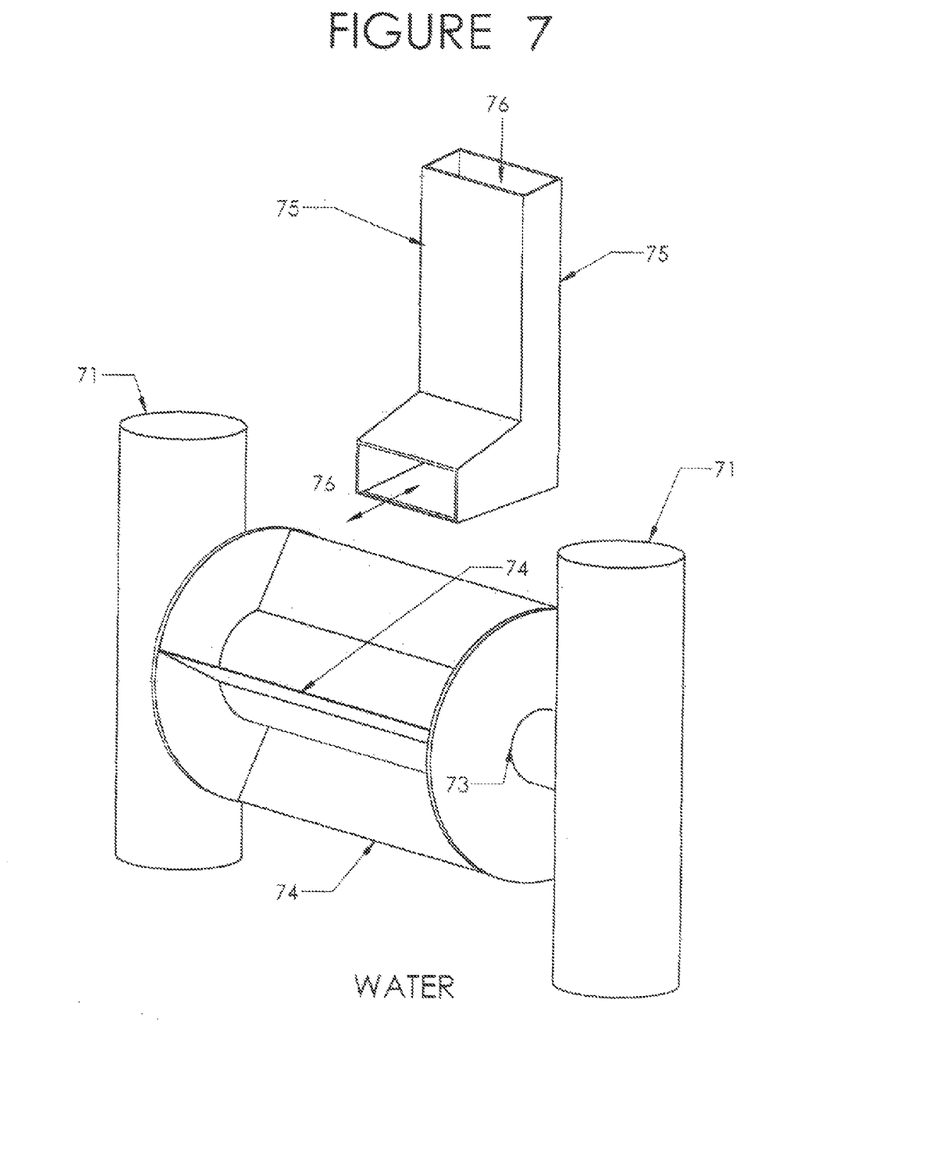
FIG. 7: Water from the tank is let down through a spout to drive a water turbine that turns water turbine-generator.

FIG. 7 shows one embodiment of the water turbine 72, whose horizontal shaft 73 is supported by vertically sliding floats (not shown in FIG. 7) mounted on two bridge columns 71. The turbine has a plurality of blades 74. The turbine is turned by the water coming down by duct(s) 75 from the overhead tank in FIG. 6. The shaft 73 is supported above the waterline by floats (not shown in the figure) so that the shaft is held high enough for the turning turbine blades to clear the water surface.

Figure 7A:
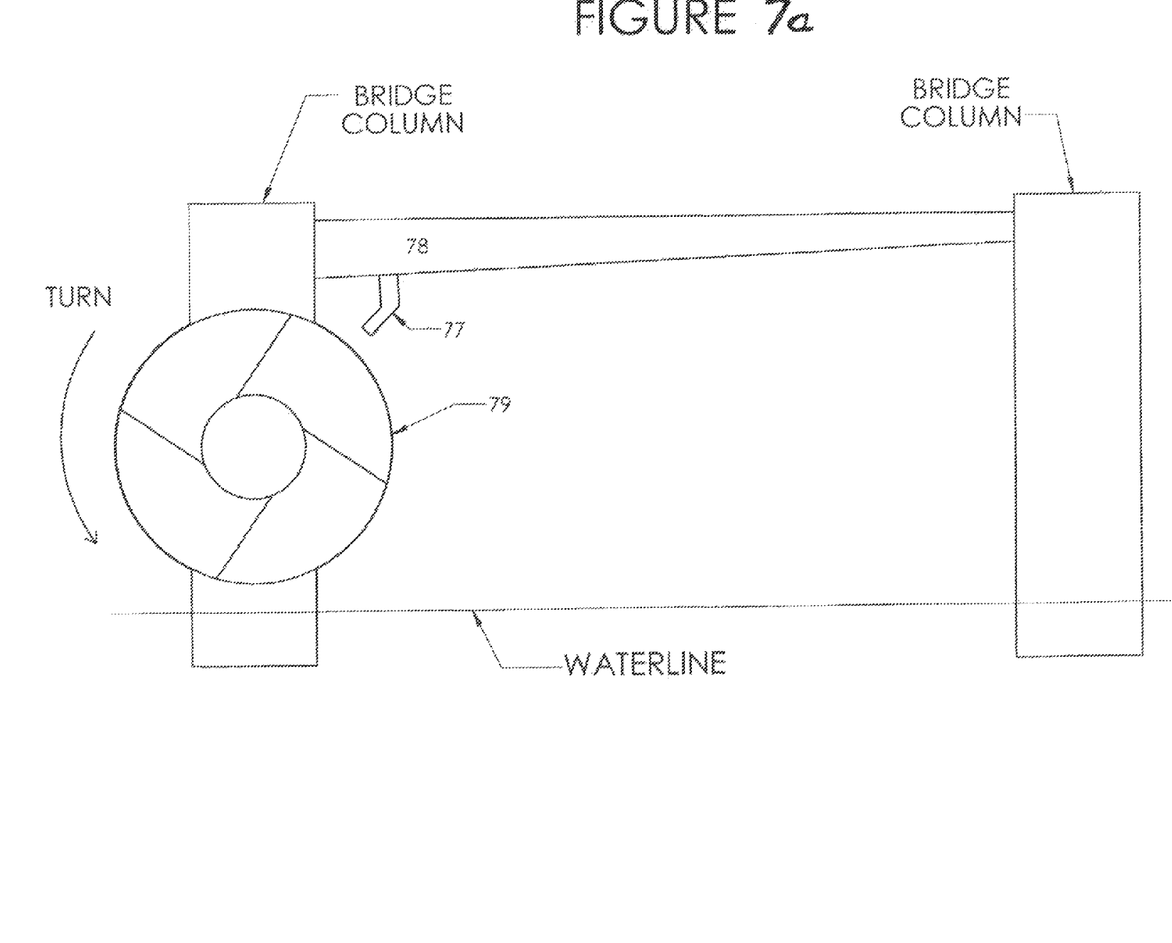
FIG. 7a: This is a cross-sectional side view of the apparatus in FIG. 7.

FIG. 7a is a side view of the apparatus showing overhead reservoir 78 with water duct allowing the directed flow of water to water turbine 79 kept above the waterline.

Embodiment 3

Wave-Operated Rack and Pinion Drives an Electric Generator

In this embodiment, the vertical movement of the wave is translated to a linear motion of a geared rack, which drives a pinion attached to an electric generator. The generator shaft has a flywheel to smooth the ensuing rotary motion and power of the generator because the power flowing from the vertical up and down motion of the wave is cyclical, not constant.

Brief Description of Drawings for Embodiment 3

Detailed Description of Embodiment 3

Figure 8:
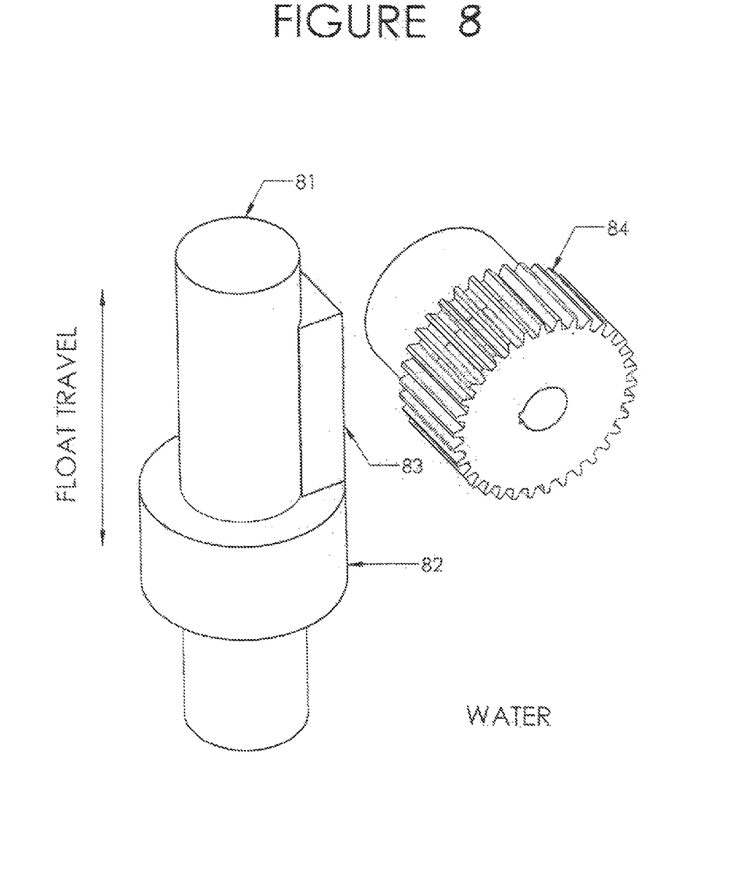
FIG. 8: shows a cylindrical float 82 surrounding a cylindrical bridge column 81 that transfers vertical motion of the wave to a pinion 84 that turns an electric generator.

FIG. 8 shows bridge column 81 on which slides a cylindrical float 82 with an attached vertical geared rack 83. Float 82 rests on the water and bobs up and down with the waves causing the rack 83 to move up and down. Pinion 84 is rotated by the rack 83 by its linear motion. Pinion 84 rotates an electric generator.

Figure 9:
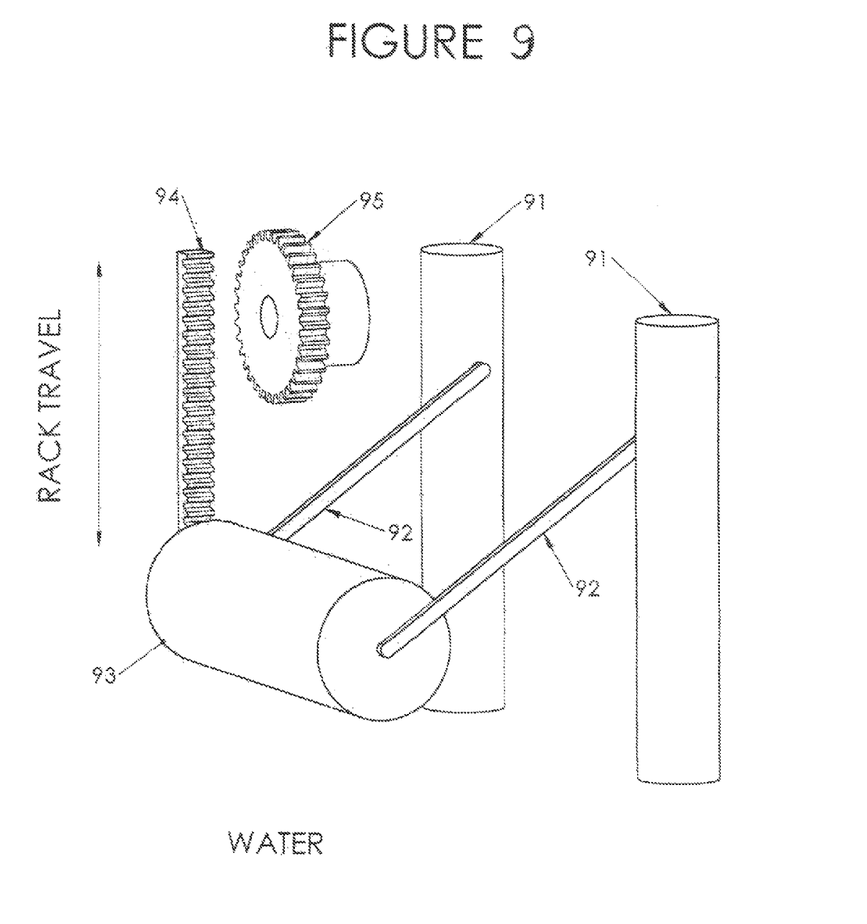
FIG. 9: shows a cylindrical float at the ends of arms hinged to bridge columns 91 that transfers vertical motion of the wave to a geared rack that turns a pinion 95 attached to an electric generator.

FIG. 9 shows two bridge columns 91 that have two hinged arms 92 with a large float 93 attached to their ends. Float 93 rests on the surface of water. Waves move the float up and down. The vertical movement of the float is transferred to the vertical geared rack 94 which rotates a pinion 95 attached to an electric generator shaft.

Figure 10:
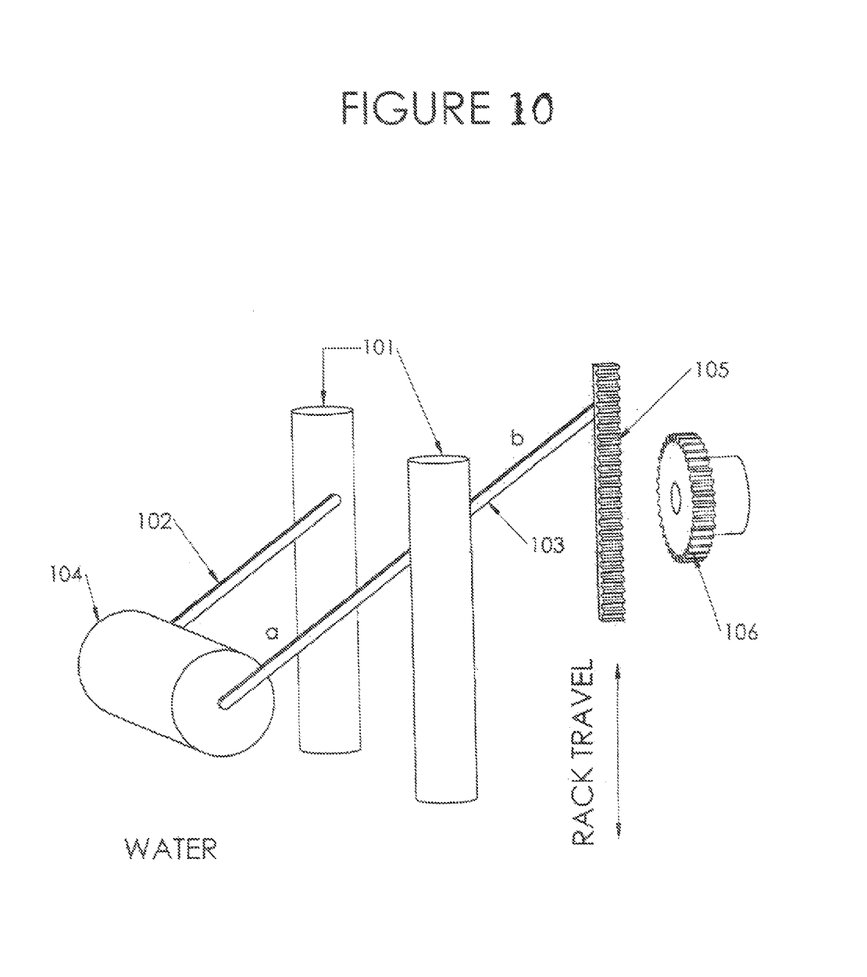
FIG. 10: shows a cylindrical float at the ends of arms hinged to bridge columns 101 that transfers magnified vertical motion of the wave to a geared rack at the extension of the arm; the vertical motion of the rack turns a pinion attached to an electric generator.

FIG. 10 shows two bridge columns 101 support a float 104 at the end of arms 102 and 103. Arm 103 is longer than arm 102, where the segment "b" of the arm 103 may be made longer than segment "a" to magnify the vertical movement of the float. The vertical motion of the arm is transferred to a geared rack 105 which rotates a pinion 106 attached to an electric generator shaft.

Embodiment 4

Floating Horizontal-Axis Water Turbine-Generator (HAWT-Generator)

In this embodiment, an horizontal-axis water turbine-generator (HAWT-generator) is turned by flowing water impinging on the turbine blades below the center line of the turbine. The turbine is floated so that only the turbine blades below the center line of the turbine are submerged below the water line. The water turbine turns an electric generator integral with the turbine's axis or the generator may be driven by a gear system powered by the water turbine. The electricity generated is fed to the grid.

Brief Description of Drawings for Embodiment 4

Detailed Description of Embodiment 4

Figure 11:
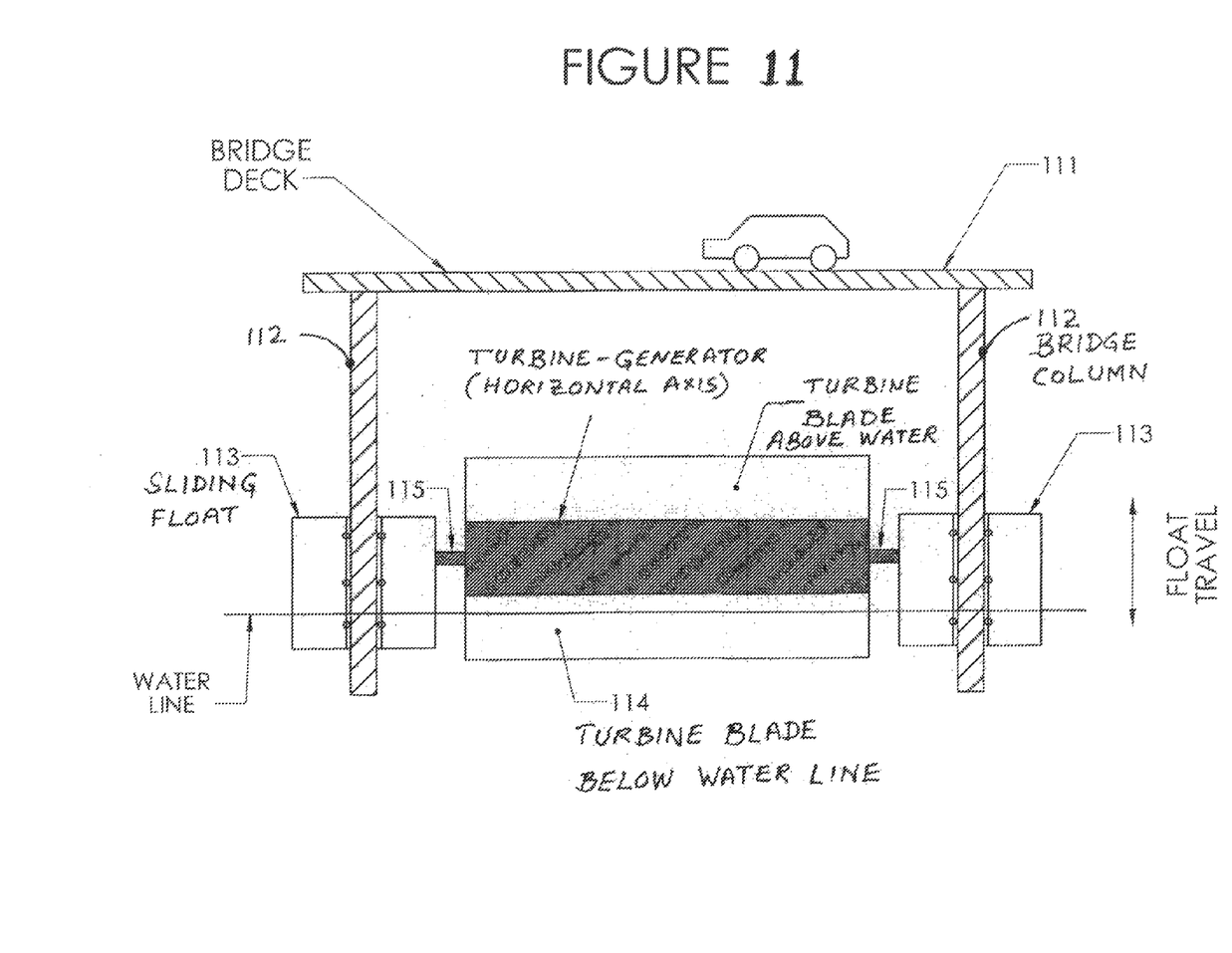
FIG. 11: Shows two bridge columns that support a horizontal-axis water turbine-generator.

In FIG. 11, horizontal-axis turbine-generator may have a plurality of blades 114. In the embodiment shown, an electric generator is built into the axis of the HAWT. The submerged turbine blades under the waterline are turned by the flowing water to produce electricity through the electric generator. Floats 113 that slide up and down the two bridge columns 112 support the ends of the shaft 115 of the HAWT-generator above the water so that only the blades below the turbine axis are submerged in the water to be rotated by water energy.

The invention claimed is:

1. A system for converting wave and hydrokinetic energy comprising;
   a. a bridge including a bridge deck and two or more columns disposed in a body of water;
   b. a water storage tank elevated above the body of water and supported by two or more bridge columns;
   c. a pump for pumping water to the storage tank by wave hydrokinetic energy;
   d. a water turbine, including a horizontal shaft, rotated by water let down from the water storage tank and positioned between two bridge columns;
   e. vertically sliding floats mounted on the two bridge columns and supporting the horizontal shaft of the water turbine at a maximum vertical distance below the water storage tank to allow the water turbine to clear the surface of the body of water.

2. A system for converting water current and hydrokinetic energy comprising;
   a. a bridge including at least two columns disposed in a body of water;
   b. vertically sliding floats on at least two adjacent columns, the floats having a slidable central passage receiving the column;
   c. a water turbine positioned in between the two adjacent columns and comprising a central passage and a horizontal shaft along an axis of the central passage, each end of the horizontal shaft is supported by one of said sliding floats; and
   d. an electric generator powered by the water turbine, wherein the floats slide along the columns to keep the upper part of the water turbine above the water so that only the turbine blades below the center line of the water turbine are submerged under the water line to capture the energy from waves, currents and tidal flow.

3. The system of claim 2, wherein the electric generator is housed inside of the central passage along said axis.

* * * * *